US010739609B1

(12) United States Patent
Stromberg et al.

(10) Patent No.: US 10,739,609 B1
(45) Date of Patent: Aug. 11, 2020

(54) JITTER MINIMIZATION FLEXURE POINTING SYSTEM

(71) Applicant: National Technology & Engineering Solutions of Sandia, LLC, Albuquerque, NM (US)

(72) Inventors: Peter G. Stromberg, Albuquerque, NM (US); Patrick S. Barney, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 156 days.

(21) Appl. No.: 16/051,570

(22) Filed: Aug. 1, 2018

(51) Int. Cl.
G02B 27/64 (2006.01)
G02B 23/16 (2006.01)

(52) U.S. Cl.
CPC ............ G02B 27/646 (2013.01); G02B 23/16 (2013.01)

(58) Field of Classification Search
CPC ............................. G02B 27/646; G02B 23/16
USPC .......................................................... 359/399
See application file for complete search history.

(56) References Cited

U.S. PATENT DOCUMENTS

| | | | | |
|---|---|---|---|---|
| 3,728,948 A * | 4/1973 | Fraser | ................... | G02B 27/646 396/421 |
| 4,249,792 A * | 2/1981 | Moirez | ................ | G02B 27/646 359/557 |
| 4,927,257 A * | 5/1990 | Enterline | ................ | G02B 7/183 126/688 |
| 4,998,809 A * | 3/1991 | Tsuji | ........................ | G02B 9/12 359/557 |
| 5,053,794 A * | 10/1991 | Benz | ........................ | G02B 7/00 359/819 |
| 5,117,246 A * | 5/1992 | Takahashi | ............... | G02B 7/102 348/208.99 |
| 5,243,462 A * | 9/1993 | Kobayashi | ........... | G02B 27/646 359/557 |
| 5,285,313 A * | 2/1994 | Kobayashi | ........... | G02B 27/646 359/554 |
| 5,642,237 A * | 6/1997 | Miyawaki | ............... | G02B 7/183 359/212.2 |
| 5,771,069 A * | 6/1998 | Kobayashi | ............ | G02B 27/646 348/208.11 |
| 5,786,936 A * | 7/1998 | Baumann | ........... | G02B 21/0012 359/368 |
| 5,905,591 A * | 5/1999 | Duncan | ................... | G02B 23/16 248/346.3 |
| RE36,578 E * | 2/2000 | Kobayashi | ........... | G02B 27/646 359/554 |

(Continued)

*Primary Examiner* — Collin X Beatty
(74) *Attorney, Agent, or Firm* — Yee & Associates, P.C.; Samantha Updegraff

(57) ABSTRACT

The illustrative embodiments provide for a telescope. The telescope includes a housing; an optical assembly disposed inside the housing and configured to gather light from a distant object; and a jitter reduction system connected to the housing. The jitter reduction system includes a first flexure assembly comprising a first base to which is attached to a first armature connected to a first linear motor winding configured to push out a first flexure connected to the first armature and to push out a second flexure connected to the first armature opposite the first flexure, wherein the first flexure and the second flexure have a first normal axis pointing through a center of mass of the optical assembly.

18 Claims, 11 Drawing Sheets

(56) References Cited

U.S. PATENT DOCUMENTS

| | | | | |
|---|---|---|---|---|
| 6,478,434 | B1* | 11/2002 | Streetnnan | G02B 7/183 |
| | | | | 318/568.17 |
| 6,519,084 | B1* | 2/2003 | Kawasaki | B64G 1/66 |
| | | | | 359/225.1 |
| 6,717,727 | B2* | 4/2004 | Barziza | G02B 23/16 |
| | | | | 359/363 |
| 9,377,614 | B2* | 6/2016 | Laborde | G02B 7/1827 |
| 9,823,459 | B2* | 11/2017 | Bullard | G02B 23/06 |
| 10,409,030 | B1* | 9/2019 | Winrow | G02B 23/02 |
| 2002/0154400 | A1* | 10/2002 | Belcher | G02B 7/001 |
| | | | | 359/430 |
| 2006/0132908 | A1* | 6/2006 | Baun | G02B 7/1827 |
| | | | | 359/366 |
| 2009/0303586 | A1* | 12/2009 | Dobermann | G02B 23/00 |
| | | | | 359/399 |
| 2010/0118402 | A1* | 5/2010 | Washisu | G02B 27/646 |
| | | | | 359/557 |
| 2014/0368911 | A1* | 12/2014 | Becker | G02B 27/644 |
| | | | | 359/554 |
| 2015/0085147 | A1* | 3/2015 | Georgy | G02B 27/646 |
| | | | | 348/208.1 |
| 2015/0309327 | A1* | 10/2015 | Dobermann | G02B 23/18 |
| | | | | 359/407 |

* cited by examiner

JITTER MINIMIZATION FLEXURE POINTING SYSTEM

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND INFORMATION

1. Field

The present disclosure relates to a jitter minimization flexure pointing system, and more particularly to a system for reducing jitter in telescopes using a flexure pointing system.

2. Background

Optical resolution is an important aspect of telescopes and other optical visualization instruments. The term "optical visualization instrument" contemplates any system that relies on various wavelengths of light for observation, and includes but is not limited to telescopes, microscopes, radio telescopes, infrared telescopes, ultraviolet telescopes, X-ray telescopes, gamma ray telescopes, and others. Optical resolution determines, in part, how much detail can be resolved for an object under observation. In other words, if one wanted to observe details of a particular crater on Earth's moon through a telescope, then greater optical resolution helps resolve those details.

Jitter is a source of noise that can limit the ideal optical resolution of a given telescope or another optical telescope, and thus is undesirable. As used herein, jitter refers to motion of the optical visualization instrument that has high temporal frequency relative to the time an observed object is under exposure. Jitter may result from vibrations in an assembly, an unstable support base, and other sources.

For space-based telescopes, satellites, and spacecraft, operation in a vacuum often means low mechanical damping. However, because spacecraft are compact and rigid to withstand high launch loads, jitter is easily transmitted throughout the instrument. Accordingly, for many space-based instruments, jitter can be a limiting factor for high resolution optics.

SUMMARY

The illustrative embodiments provide for a telescope. The telescope includes a housing; an optical assembly disposed inside the housing and configured to gather light from a distant object; and a jitter reduction system connected to the housing. The jitter reduction system includes a first flexure assembly comprising a first base, to which is attached to a first armature connected to a first linear motor winding, configured to push out a first flexure, connected to the first armature, and to push out a second flexure, connected to the first armature opposite the first flexure, wherein the first flexure and the second flexure have a first normal axis pointing through a center of mass of the optical assembly.

The illustrative embodiments also provide for a method of reducing jitter during observations by a telescope comprising a housing; an optical assembly disposed inside the housing and configured to gather light from a distant object; and a jitter reduction system connected to the housing, the jitter reduction system comprising: a first flexure assembly comprising a first base, to which is attached to a first armature connected to a first linear motor winding configured to push out a first flexure, connected to the first armature and to push out a second flexure, connected to the first armature opposite the first flexure, wherein the first flexure and the second flexure have a first normal axis pointing through a center of mass of the optical assembly. The method includes pointing the telescope towards the distant object. The method also includes, responsive to detecting jitter-inducing movement in the telescope, reducing jitter of the telescope by operating the first linear motor winding to push out the first flexure and the second flexure, thereby forcing the telescope to move about the center of mass in a manner which counteracts the jitter.

The illustrative embodiments also provide for another telescope. This telescope includes a housing; an optical assembly disposed inside the housing and configured to gather light from a distant object; and a jitter reduction system connected to the housing. The jitter reduction system includes a plurality of flexure assemblies comprising corresponding bases, to which are attached corresponding armatures, connected to corresponding linear motor windings, configured to push out corresponding flexures, connected to the corresponding armatures, wherein all flexures have corresponding normal axes which all point through a center of mass of the optical assembly.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that, the purpose of a jitter reduction pointing system for optical or other high-resolution pointing devices is a concept to reduce unwanted relative angular motion between a target and the imaging system. Improvements in jitter reduction directly affect image resolution, a very basic property for imaging systems. Current space-based or land-based surveillance systems typically incorporate high-resolution digital focal plane arrays (FPA's) with pixel dimensions about three microns across, and corresponding angular resolution to the object of one or less arcseconds (four micro radians). Reducing jitter allows potential for even higher resolution focal plane arrays and system capability.

Thus, the illustrative embodiments provide for a jitter reduction pointing system for optical or other high-resolution pointing devices that reduces unwanted relative angular motion between a target and the imaging system. The illustrative embodiments provide for pointing uses cross flexures to simulate a frictionless planar bearing. Three of these flexure planes may be oriented to restrict motion to only three degrees of freedom in rotation only. The linear nature of the flexures combined with linear drives on each of the flexures also allows for active control, and further jitter reduction. In addition, the orientation of the flexures locates the pivot point of the optical system about its center of mass, further isolating external vibration from causing rotational pointing error or jitter. Thus, operation of the gimbal pointing system uses cross flexures to simulate a frictionless planar bearing.

The illustrative embodiments may be applied to any pointing or observation device. As used herein, pointing or observation devices are defined to be devices which use one or more wavelengths of light to observe or to point to an object distant from the pointing or observation device. Examples of pointing or observation devices include laser finders, telescopes, microscopes, focal plane arrays, mirrors, lenses, and the like. As used herein, the term "telescope", unless specifically limited, contemplates any of a space-based telescope, an airborne telescope, a ground telescope, a radio wave telescope, an infrared telescope, a visible wavelength telescope, an ultraviolet telescope, an X-ray telescope, and a gamma ray telescope.

Figure 1:
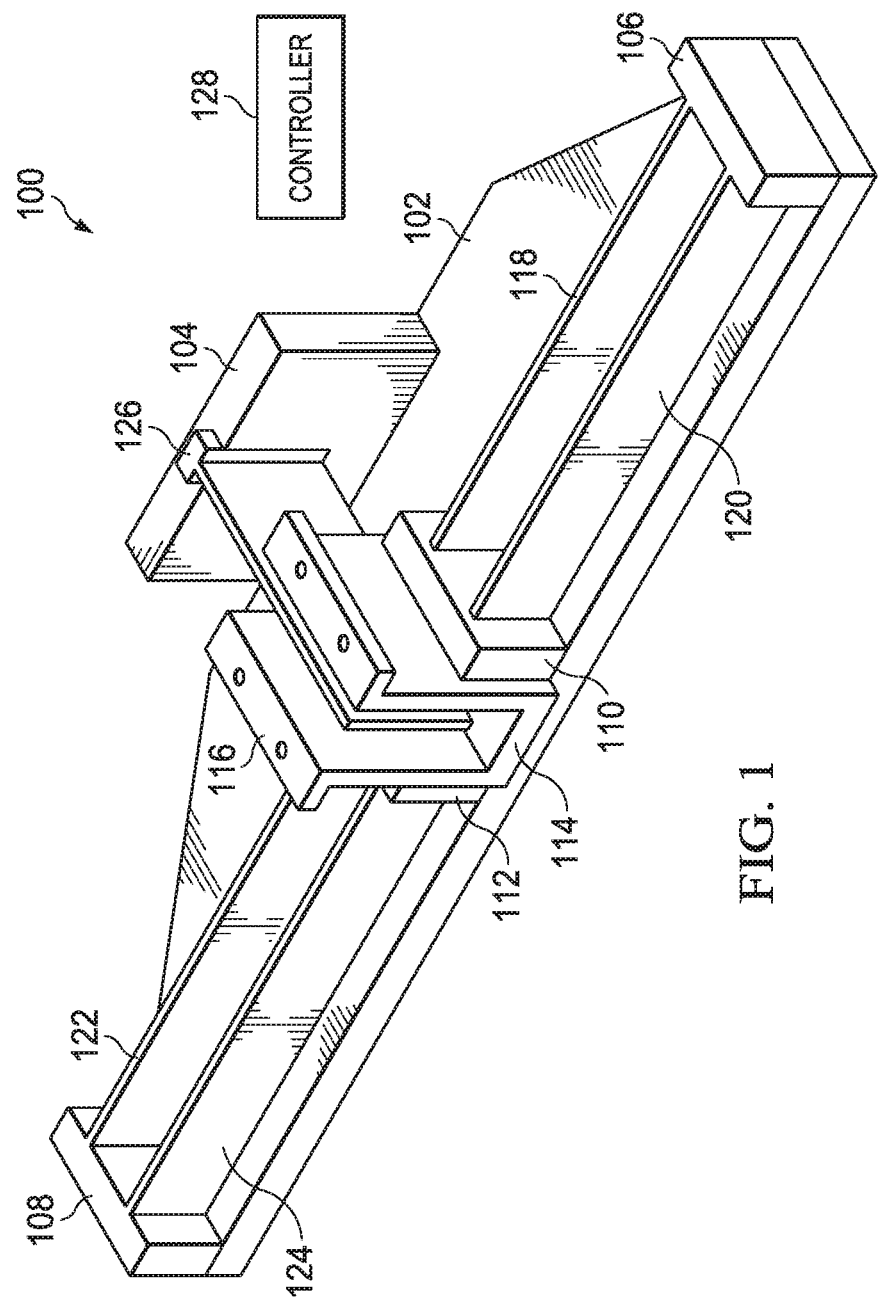
FIG. 1 illustrates a single flexure assembly, in accordance with an illustrative embodiment.

FIG. 1 illustrates a single flexure assembly, in accordance with an illustrative embodiment. Flexure assembly 100 is an example of a single flexure which can be used to reduce jitter in a pointing device, such as a telescope.

Figure 8:
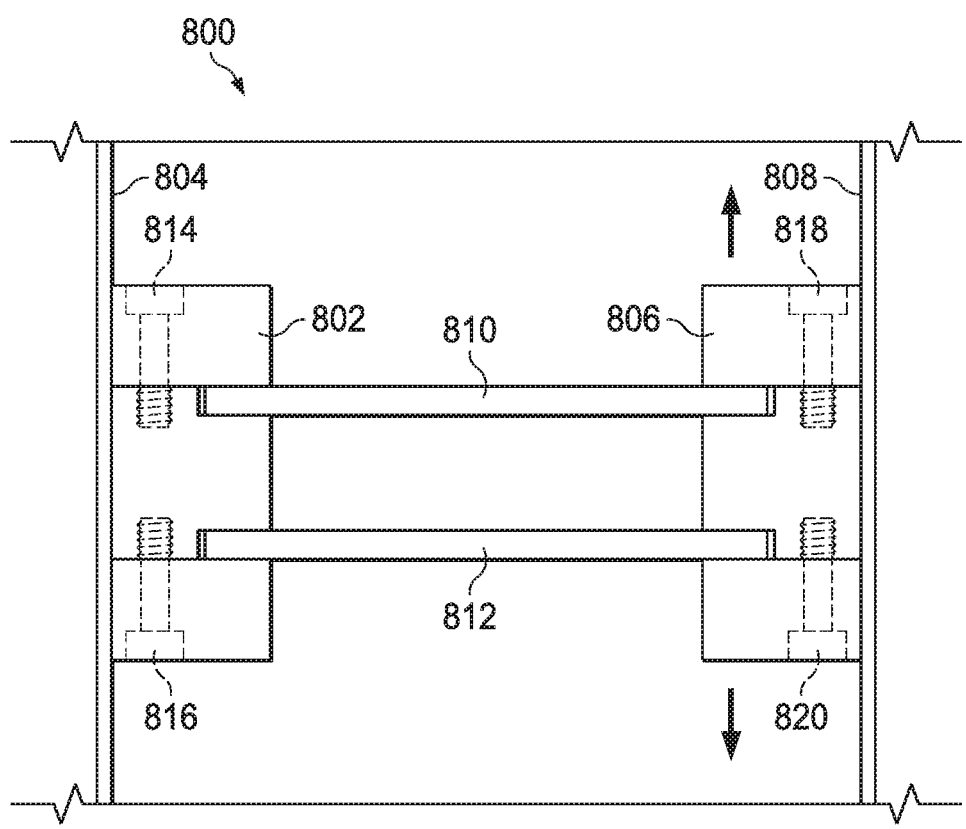
FIG. 8 illustrates an alternative arrangement for a flexure assembly, in accordance with an illustrative embodiment.

Flexure assembly 100 includes base 102 upon which the rest of the components are mounted. Base 102 includes anchor flanges, or walls as shown, against which the rest of the components press during operation. The anchor flanges include flange 104, flange 106, flange 108, flange 110, and flange 112, all of which are disposed along the same longitudinal axis. Note that while base 102 is shown as having a combination of a rectangular and trapezoidal shape, base 102 could have any shape convenient for mounting on a particular pointing device. Another example shape is shown in FIG. 8. Nevertheless, flange 106 and flange 108 should oppose each other relative to opposite sides of base 102, and flange 104 is located on a different side of base 102. Likewise, flange 110 and flange 112 should also oppose each other. Flange 110 and flange 112 also define channel 114 in which armature 116 is disposed. Flange 106 and flange 110 form a first pair of flanges. Flange 108 and flange 112 form a second pair of flanges.

Between each pair of flanges are mounted flexures which are configured to flex during operation of flexure assembly 100. A flexure, as used herein, is a strip of material which is sized and dimensioned and made of a material such that the strip of material bends when subjected to a sufficient force. A force is "sufficient" if it is high enough to cause the flexure to bend. As shown, flexure assembly 100 includes four flexures in two pairs. A first pair of flexures is flexure 118 and flexure 120. A second pair of flexures is flexure 122 and flexure 124. In some illustrative embodiments, a single flexure may be present between opposed flanges, and in other illustrative embodiments more than two flexures may be present between opposed flanges.

Regarding manufacture of the flexures, the flexures can be machined, typically wire electrical discharge machining down to a desired thickness from a single part. The thickness may be, for example, 0.020 inches thick, though other thickness may be used. A prototype was developed using titanium (6AL4V) that is solution treated and aged (STA) for greater fatigue endurance. The flexures could also be made of superelastic alloys of titanium nickel (TiNi). Additionally, the flexures could also be made of carbon composite or spring steel plates clamped into place. This style flexure is for smaller motions. Another style of flexure without the end restraint is more flexible, and is shown in FIG. 8.

Flexure assembly 100 also includes linear motor 126. Linear motor 126 is configured to drive back and forth within armature 116. As a result of this motion, armature 116 applies an outward force against the pairs of flexures through flange 110 and flange 112, respectively, thereby forcing one or both of the flexures and base 102 to bend against flange 106 and flange 108, respectively. This bending, due to the principle of the conservation of angular momentum, will force the pointing device (such as a telescope) to subtly alter the direction in which it is pointed.

A controller 128 may be used to control operation of linear motor 126 in response to detected jitter in the pointing device. Specifically, controller 128 operates linear motor 126 in order to cause flexure assembly 100 to move in a manner that counteracts the jitter in the pointing device. As a result, improved optical resolution is achieved during use of the pointing device.

Figure 2:
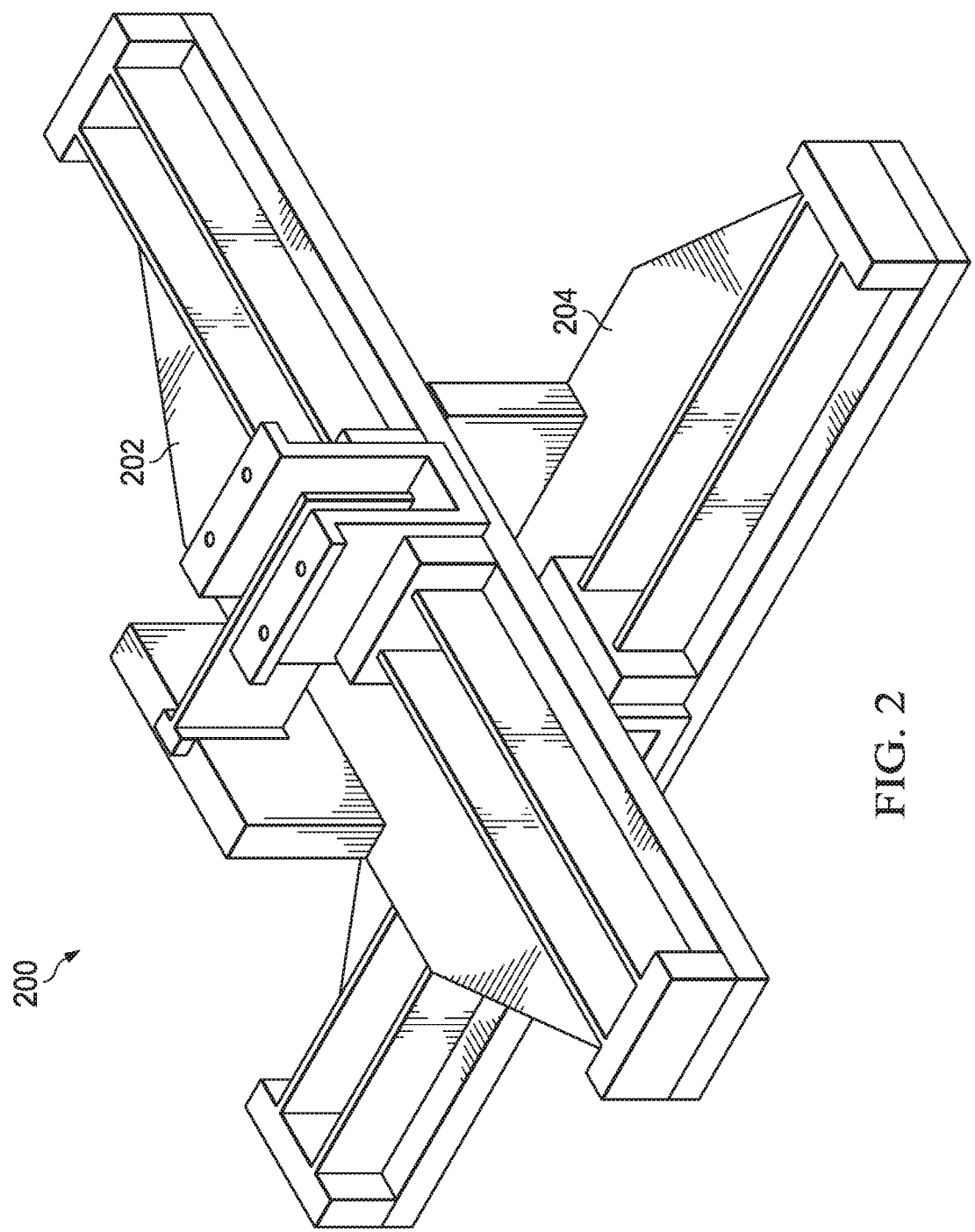
FIG. 2 illustrates a pair of connected flexure assemblies, in accordance with an illustrative embodiment.

FIG. 2 illustrates a pair of connected flexure assemblies, in accordance with an illustrative embodiment. As shown in FIG. 2, complex flexure assembly 200 is formed by the combination of flexure assembly 202 and flexure assembly 204. Each of flexure assembly 202 and flexure assembly 204 has a structure and a function which is described with respect to flexure assembly 100 of FIG. 1.

However, complex flexure assembly 200 is "complex" because more than one interconnected flexure assembly is present. As shown, flexure assembly 202 and flexure assembly 204 are stacked, with flexure assembly 202 disposed at a ninety-degree angle relative to the longitudinal axis of flexure assembly 204. Flexure assembly 202 is connected to flexure assembly 204 in that the base of flexure assembly 202 is attached to the armature of flexure assembly 204.

Note that, due to the principle of the conservation of angular momentum, if one flexure assembly moves, then the other flexure assembly will also be forced to move whether or not it flexes. Thus, the movement of one moves the other, and if they both move, then complex flexure assembly 200 can flex the entire complex assembly in three dimensions. In this manner, the stacked flexure assemblies can act as a simulated ball bearing, or near frictionless interface between two planes. The motions allowed on the flexures are linear versus applied force, making position control much easier than through a roller bearing at the very small angles of interest. As used herein, a "very small angle" is any angle less than ten microradians.

Figure 3:
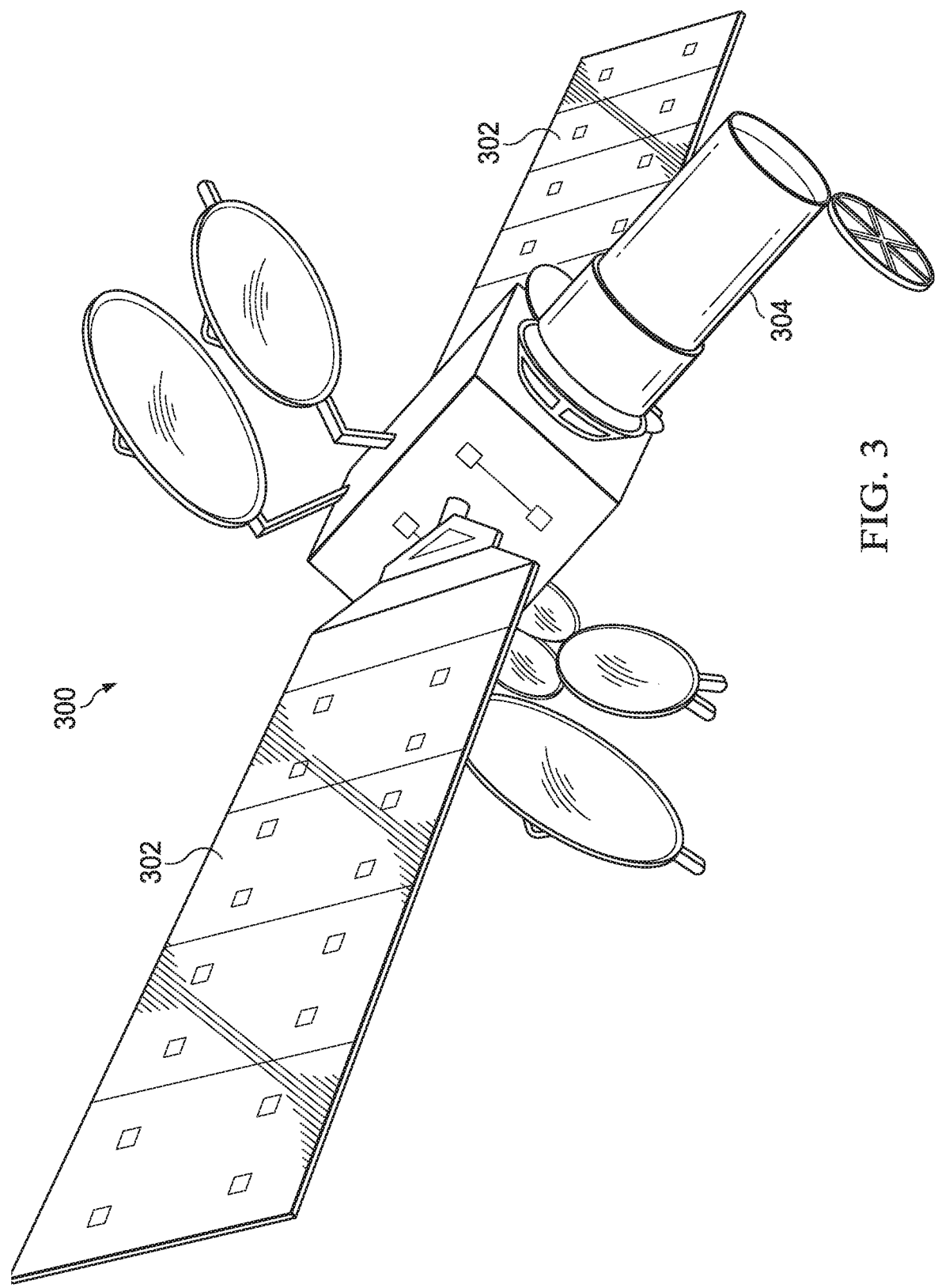
FIG. 3 illustrates a space-based telescope, in accordance with an illustrative embodiment.

FIG. 3 illustrates a space-based telescope, in accordance with an illustrative embodiment. Telescope 300 is an example of a pointing or observation device to which a flexure assembly or a complex flexure assembly, such as those shown in FIG. 1 or FIG. 2, may be attached. Telescope 300 includes solar panels 302 and housing 304. The type of telescope within housing 304 is not relevant for purposes of the illustrative embodiments, as the illustrative embodiments can be used to reduce jitter in any kind of pointing or observation device.

Note that flexure assemblies placed on space-based telescopes may be arranged to avoid launch loads during launch of the space telescope. For example, the flexures may be supported during launch by one or more launch locks. An example of a launch lock may be one or more pins (preferably three pins) that may engage across the functional space of the flexures, rigidly holding the flexures to the telescope. In this manner, launch loads on the flexures are avoided. Once the space-based telescope is deployed in space, the pins or whatever launch lock is used are released to allow motion of the flexures.

Figure 4:
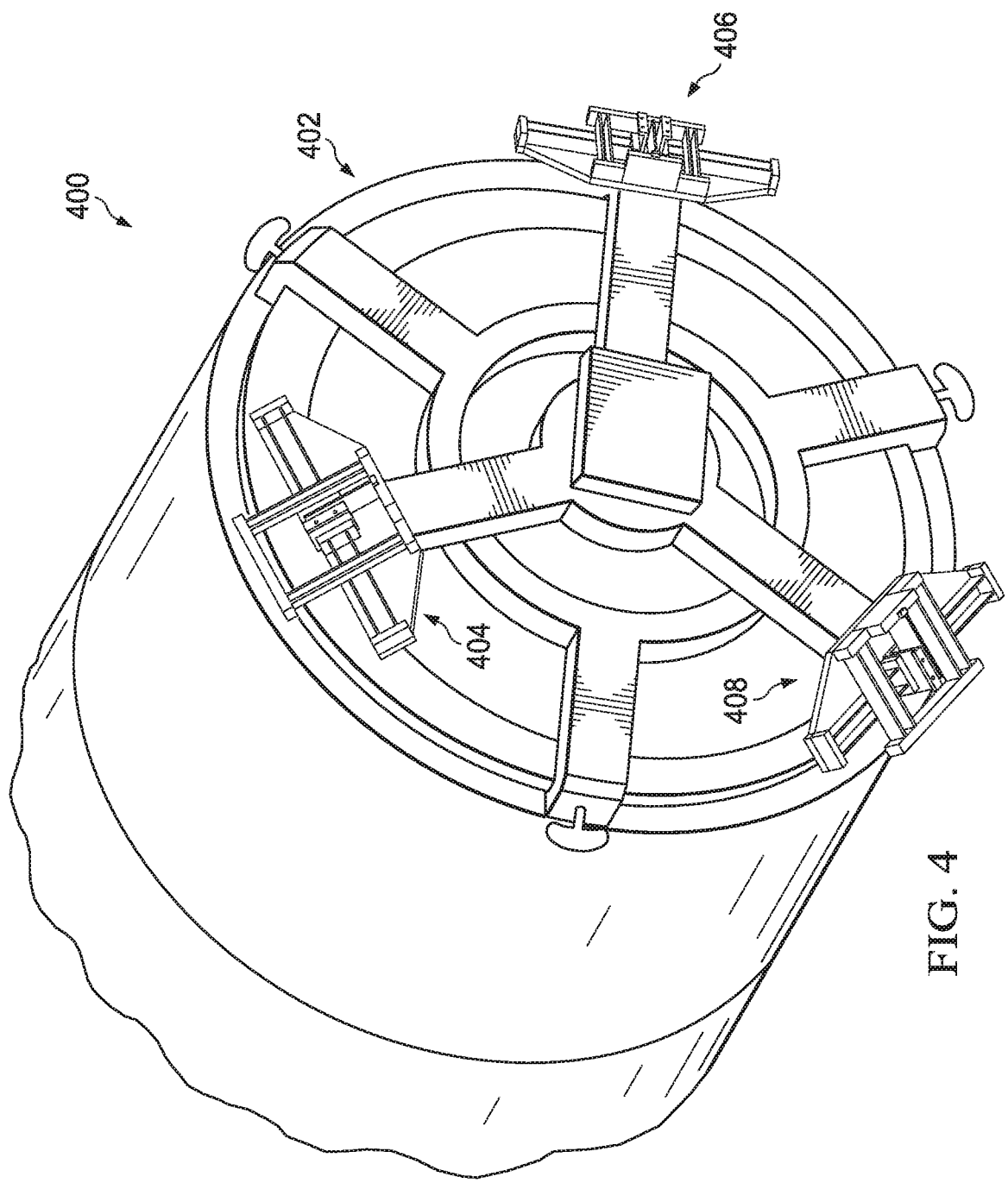
FIG. 4 illustrates a telescope equipped with a system of three flexure assemblies, in accordance with an illustrative embodiment.

FIG. 4 illustrates a telescope equipped with a system of three flexure assemblies, in accordance with an illustrative embodiment. Telescope 400 may be, for example, part of telescope 300 in FIG. 3. In this illustrative embodiment, telescope 400 includes end 402, which includes the various structures shown near the edge of end 402.

Among these structures are a system of three complex flexure assemblies, including complex flexure assembly 404, complex flexure assembly 406, and complex flexure assembly 408. Each complex flexure assembly may be, for example, complex flexure assembly 200 shown in FIG. 2. The system of complex flexure assemblies is distributed evenly around the perimeter of end 402, such that in this particular example each complex flexure assembly is located one hundred and twenty degrees relative to the other complex flexure assemblies.

Thus, the illustrative embodiments provide for three crossed flexure assemblies. However, more or fewer flexures assemblies could be present, whether complex as shown in FIG. 2 or singular as shown in FIG. 1.

In the illustrative embodiment of FIG. 4, each complex flexure assembly is oriented so the normal to the plane of the flexures points to the center of gravity of the pointing device. As can be seen in FIG. 4, the three complex flexure assemblies are located at the base of an optical assembly (telescope 400), pointed toward the center of mass of the optical assembly, and clocked around the axis of the optical assembly at 120 degrees. As used herein, the term "center of mass" is defined as follows: The "center of mass" of a distribution of mass in space is the unique point where the weighted relative position of the distributed mass sums to zero or the point where if a force is applied causes it to move in direction of force without rotation of the overall object.

Figure 5:
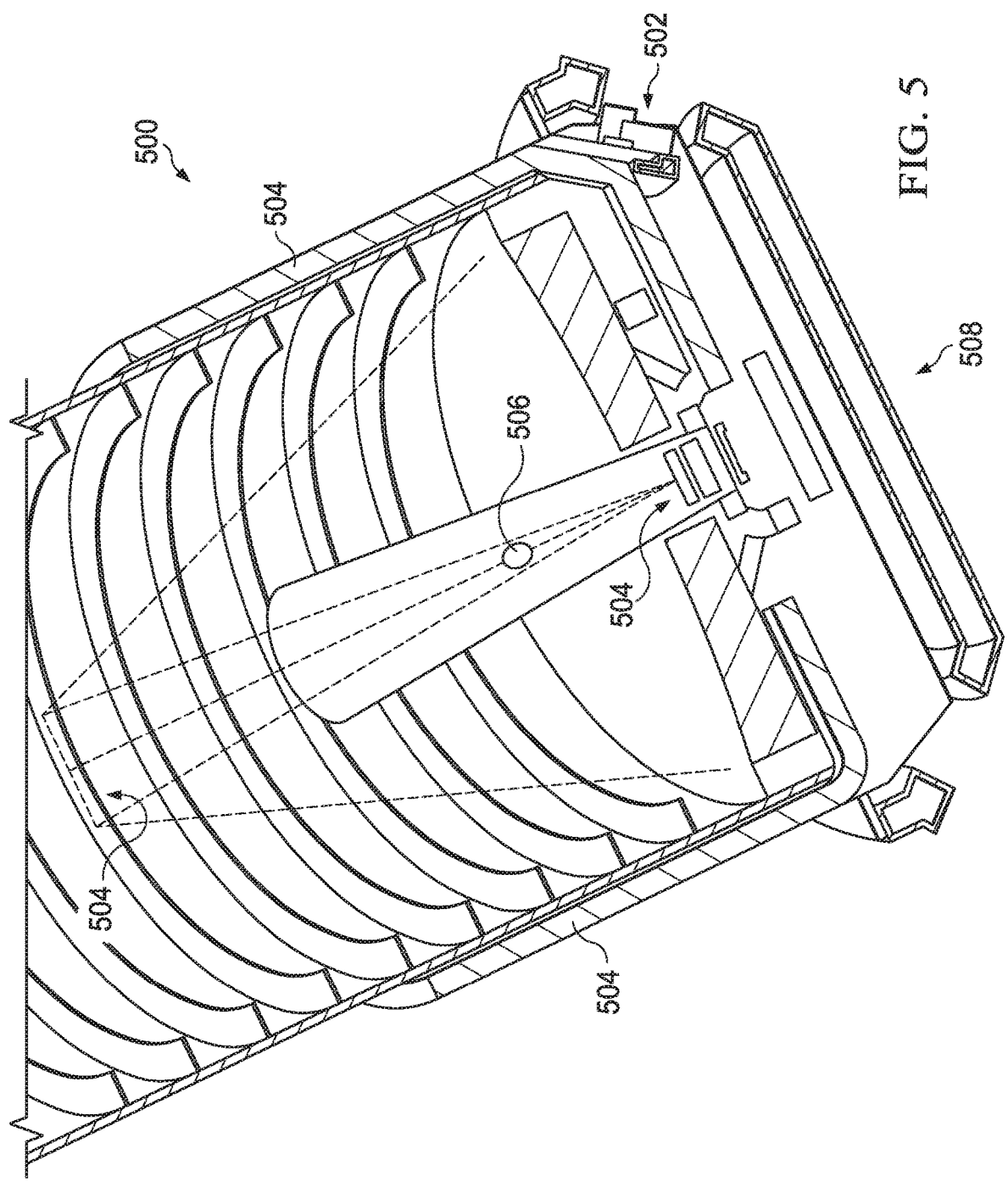
FIG. 5 illustrates a cross section of the telescope shown in FIG. 4, in accordance with an illustrative embodiment.

FIG. 5 illustrates a cross-section of the telescope shown in FIG. 4, in accordance with an illustrative embodiment. Telescope 500 is the same as telescope 400 of FIG. 4, except that a cross-section is depicted to show internal components of telescope 500. Complex flexure assembly 502 corresponds to complex flexure assembly 406 of FIG. 4. FIG. 5 also shows optical assembly 504, which is the mirror, lens, or grating system which is used to image a distant target.

FIG. 5 shows the location of one of the flexure assemblies (complex flexure assembly 502) on the right side of the image with its normal (perpendicular axis) through the center of mass 506 of the moving optical assembly 504. Note that center of mass 506 is a point in space, and not a component of the optical assembly itself.

Again, three of these flexure assemblies are oriented to restrict motion to only three degrees of freedom in rotation only. The linear nature of the flexures combined with linear drives on each of the flexures also allows for active control, and further jitter reduction. In addition, the orientation of the flexures locates the pivot point of the optical system about its center of mass 506, further isolating external vibration from causing rotational pointing error or jitter.

Orientation of the flexures so their normal lies through the center of mass 506 is most useful. If the flexure assemblies' normal axes are pointed to a common point offset from the center of mass 506, when the base 508 is accelerated, the reaction force create a moment. This moment rotates the optical assembly 504. Even small base acceleration inputs would cause small rotations or jitter. If, on the other hand, the system of complex flexure assemblies has the pivot point at the center of gravity 506, an input acceleration at base 508 merely translates the structure with no rotation or jitter.

Figure 6:
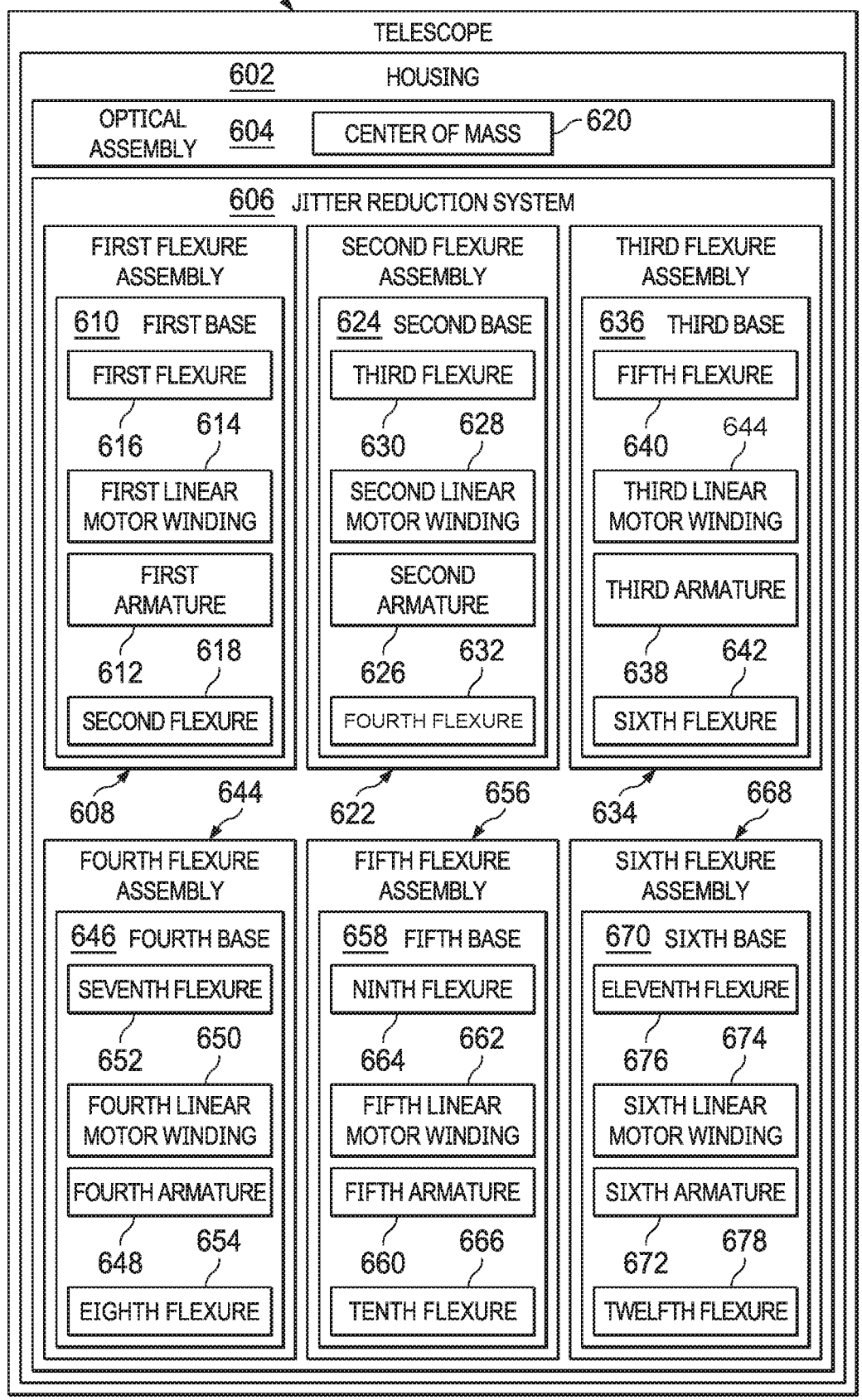
FIG. 6 illustrates a telescope, in accordance with an illustrative embodiment.

FIG. 6 illustrates a telescope, in accordance with an illustrative embodiment. Telescope 600 is a variation of telescope 300 of FIG. 3, telescope 400 of FIG. 4, or telescope 500 of FIG. 5.

Telescope 600 includes housing 602 and optical assembly 604 disposed inside housing 602 and configured to gather light from a distant object. Telescope 600 also includes jitter reduction system 606 connected to housing 602.

Jitter reduction system 606 includes first flexure assembly 608 comprising a first base 610 to which is attached to a first armature 612 connected to a first linear motor winding 614 configured to push out a first flexure 616 connected to the first armature 612 and to push out a second flexure 618 connected to the first armature 612 opposite the first flexure 616. The first flexure 616 and the second flexure 618 have a first normal axis pointing through a center of mass 620 of the optical assembly 604.

Telescope 600 may be varied. For example, telescope 600 may also include multiple flexure assemblies. Thus, telescope 600 may also include second flexure assembly 622 comprising a second base 624 to which is attached to a second armature 626 connected to a second linear motor winding 628 configured to push out a third flexure 630 connected to the second armature 626 and to push out a fourth flexure 632 connected to the second armature 626 opposite the third flexure 630. The third flexure 630 and the fourth flexure 632 have a second normal axis pointing through the center of mass 620 of the optical assembly 604.

Other variations are possible. For example, the second flexure assembly 622 may be stacked on the first flexure assembly 608 and oriented ninety degrees with respect to both the normal axis and a first longitudinal axis of the first flexure assembly 608. Preferably, the second flexure assembly 622 is located on a different portion of the housing 602 relative to the first flexure assembly 608.

In still another illustrative embodiment, the jitter reduction system 606 may also include third flexure assembly 634 comprising a third base 636 to which is attached to a third armature 638 connected to a third linear motor winding 644 configured to push out a fifth flexure 640 connected to the third armature 638 and to push out a sixth flexure 642 connected to the third armature 638 opposite the fifth flexure 640. The fifth flexure 640 and the sixth flexure 642 have a third normal axis pointing through the center of mass 620 of the optical assembly 604. The third flexure assembly 634 is located on another portion of the housing 602 relative to both the first flexure assembly 608 and the second flexure assembly 622. In another illustrative embodiment, the first flexure assembly 608, the second flexure assembly 622, and the third flexure assembly 634 are distributed at one-hundred twenty degree angles about a center of one end of the housing.

In still another illustrative embodiment, jitter reduction system 606 may have additional flexure assemblies. Thus, jitter reduction system 606 may include a fourth flexure assembly 644 stacked on the first flexure assembly 608 and oriented ninety degrees with respect to both the first normal axis and a first longitudinal axis of the first flexure assembly 608. The fourth flexure assembly 644 includes a fourth base 646 to which is attached to a fourth armature 648 connected to a fourth linear motor winding 650 configured to push out a seventh flexure 652 connected to the fourth armature 648 and to push out an eighth flexure 654 connected to the fourth armature 648 opposite the seventh flexure 652. The seventh flexure 652 and the eighth flexure 654 have a fourth normal axis pointing through the center of mass 620 of the optical assembly 604.

In this same illustrative embodiment, jitter reduction system 606 also includes a fifth flexure assembly 656 stacked on the second flexure assembly 622 and oriented ninety degrees with respect to both the second normal axis and a second longitudinal axis of the second flexure assembly 622. The fifth flexure 656 assembly including a fifth base 658 to which is attached to a fifth armature 660 connected to a fifth linear motor winding 662 configured to push out a ninth flexure 664 connected to the fifth armature 660 and to push out a tenth flexure 666 connected to the fifth armature 660 opposite the ninth flexure 664. The ninth flexure 664 and the tenth flexure 666 have a fifth normal axis pointing through the center of mass 620 of the optical assembly 604.

In this same illustrative embodiment, jitter reduction system 606 also includes a sixth flexure assembly 668 stacked on the third flexure assembly 634 and oriented ninety degrees with respect to both the third normal axis and a third longitudinal axis of the third flexure assembly 634. The sixth flexure assembly 668 includes a sixth base 670 to which is attached to a sixth armature 672 connected to a sixth linear motor winding 674 configured to push out an eleventh flexure 676 connected to the sixth armature 672 and to push out a twelfth flexure 678 connected to the sixth armature 672 opposite the eleventh flexure 676. The eleventh flexure 676 and the twelfth flexure 678 have a sixth normal axis pointing through the center of mass 620 of the optical assembly 604.

Still other variations are possible. More or fewer flexures could be present and in different orientations with respect to individual stacks of flexure assemblies. More or fewer flexure assemblies, as well as more or fewer complex flexure assemblies, may be present distributed around optical assembly 604. In various illustrative embodiment, telescope 600 may be any optical pointing device instead. Telescope 600 may specifically be any of a space-based telescope, a radio wave telescope, an infrared telescope, a visible wavelength telescope, an ultraviolet telescope, an X-ray telescope, and a gamma ray telescope.

Telescope 600 may also be described differently in terms of groups of components, rather than as individual components. For example, telescope 600 could also be varied into the following examples.

Telescope 600 may also be characterized as a housing; an optical assembly disposed inside the housing and configured to gather light from a distant object; and a jitter reduction system connected to the housing, the jitter reduction system comprising: a plurality of flexure assemblies comprising corresponding bases to which are attached corresponding armatures connected to corresponding linear motor windings configured to push out corresponding flexures connected to the corresponding armatures, wherein all flexures have corresponding normal axes which all point through a center of mass of the optical assembly. In this case, the jitter reduction system may further comprise: an additional plurality of flexure assemblies connected to the plurality of flexure assemblies such that the jitter reduction system comprises pairs of stacked flexure assemblies distributed around a center of one end of the housing. The pairs of stacked flexure assemblies may be evenly distributed about the center.

Thus, the illustrative embodiments may be varied from the examples shown in FIG. 6 and those described with respect to FIG. 1 through FIG. 5. Accordingly, the above illustrative embodiments do not necessarily limit the other examples or the claimed inventions described herein.

Figure 7:
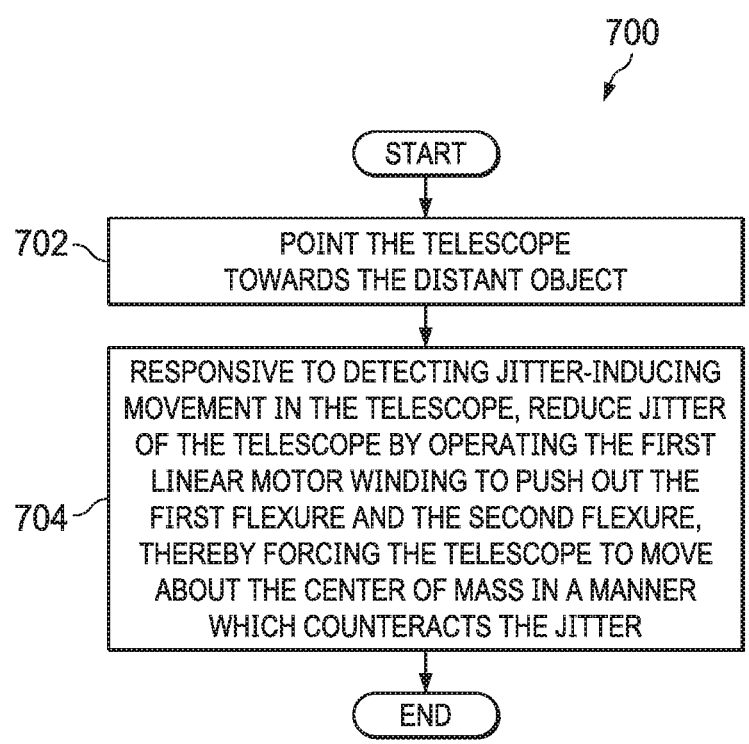
FIG. 7 illustrates a method of reducing jitter when using a telescope, in accordance with an illustrative embodiment.

FIG. 7 illustrates a method of reducing jitter when using a telescope, in accordance with an illustrative embodiment. Method 700 may be a variation of the uses of the illustrative embodiments described above with respect to FIG. 1 through FIG. 6. Method 700 may be characterized as a method of reducing jitter during observations by a telescope comprising a housing; an optical assembly disposed inside the housing and configured to gather light from a distant object; and a jitter reduction system connected to the housing, the jitter reduction system comprising: a first flexure assembly comprising a first base to which is attached to a first armature connected to a first linear motor winding configured to push out a first flexure connected to the first armature and to push out a second flexure connected to the first armature opposite the first flexure, wherein the first flexure and the second flexure have a first normal axis pointing through a center of mass of the optical assembly.

Method 700 then includes pointing the telescope towards the distant object (operation 702). Method 700 then includes, responsive to detecting jitter-inducing movement in the telescope, reducing jitter of the telescope by operating the first linear motor winding to push out the first flexure and the second flexure, thereby forcing the telescope to move about the center of mass in a manner which counteracts the jitter (operation 704). In one illustrative embodiment, the method may terminate thereafter.

Method 700 may be varied or extended. In particular, method 700 contemplates expanding operation 704 to include actuating multiple flexure assemblies. Thus, for example, assume the jitter reduction system further comprises: a second flexure assembly comprising a second base to which is attached to a second armature connected to a second linear motor winding configured to push out a third flexure connected to the second armature and to push out a fourth flexure connected to the second armature opposite the third flexure, wherein the third flexure and the fourth flexure have a second normal axis pointing through the center of mass of the optical assembly. In this case, method 700 also may include, responsive to detecting jitter-inducing movement in the telescope, further reducing jitter of the telescope by operating the second linear motor winding to push out the third flexure and the fourth flexure, thereby forcing the telescope to move about the center of mass in a manner which counteracts the jitter.

In an illustrative embodiment, the second flexure assembly is stacked on the first flexure assembly and oriented ninety degrees with respect to both the normal axis and a first longitudinal axis of the first flexure assembly, whereby movement of the first flexure and the second flexure is at a ninety-degree angle relative to the third flexure and the fourth flexure. In another illustrative embodiment, the second flexure assembly is located on a different portion of the housing relative to the first flexure assembly.

In another illustrative embodiment, assume the jitter reduction system further comprises: a third flexure assembly comprising a third base to which is attached to a third armature connected to a third linear motor winding configured to push out a fifth flexure connected to the third armature and to push out a sixth flexure connected to the third armature opposite the fifth flexure, wherein the fifth flexure and the sixth flexure have a third normal axis pointing through the center of mass of the optical assembly, and wherein the third flexure assembly is located on another portion of the housing relative to both the first flexure assembly and the second flexure assembly. In this case, method 700 also includes, responsive to detecting jitter-inducing movement in the telescope, further reducing jitter of the telescope by operating the third linear motor winding to push out the fifth flexure and the sixth flexure, thereby forcing the telescope to move about the center of mass in a manner which counteracts the jitter. In yet another illustrative embodiment, the first flexure assembly, the second flexure assembly, and the third flexure assembly are distributed at one-hundred twenty degree angles about a center of one end of the housing.

In yet another illustrative embodiment, assume that the jitter reduction system further comprises a fourth flexure assembly stacked on the first flexure assembly and oriented ninety degrees with respect to both the first normal axis and a first longitudinal axis of the first flexure assembly, the fourth flexure assembly comprising a fourth base to which is attached to a fourth armature connected to a fourth linear motor winding configured to push out a seventh flexure connected to the fourth armature and to push out an eighth flexure connected to the fourth armature opposite the seventh flexure, wherein the seventh flexure and the eighth flexure have a fourth normal axis pointing through the center of mass of the optical assembly; a fifth flexure assembly stacked on the second flexure assembly and oriented ninety degrees with respect to both the second normal axis and a second longitudinal axis of the second flexure assembly, the fifth flexure assembly comprising a fifth base to which is attached to a fifth armature connected to a fifth linear motor winding configured to push out a ninth flexure connected to the fifth armature and to push out a tenth flexure connected to the fifth armature opposite the ninth flexure, wherein the ninth flexure and the tenth flexure have a fifth normal axis pointing through the center of mass of the optical assembly; and a sixth flexure assembly stacked on the third flexure assembly and oriented ninety degrees with respect to both the third normal axis and a third longitudinal axis of the third flexure assembly, the sixth flexure assembly comprising a sixth base to which is attached to a sixth armature connected to a sixth linear motor winding configured to push out an eleventh flexure connected to the sixth armature and to push out a twelfth flexure connected to the sixth armature opposite the eleventh flexure, wherein the eleventh flexure and the twelfth flexure have a sixth normal axis pointing through the center of mass of the optical assembly. In this case, method 700 also includes, responsive to detecting jitter-inducing movement in the telescope, further reducing jitter of the telescope by: operating all linear motor windings to push out all the flexures, thereby forcing the telescope to move about the center of mass in a manner which counteracts the jitter.

Still other variations are possible. For example, method 700 may be characterized as operating the telescope as a space-based telescope. Method 700 may also include the act of launching the telescope into space.

Yet other variations are possible. Thus, the illustrative embodiments are not necessarily limited to the example of method 700 or the other techniques described elsewhere herein.

FIG. 8 illustrates an alternative arrangement for a flexure assembly, in accordance with an illustrative embodiment. Flexure 800 accomplishes a similar objective as the flexures described in FIG. 1 through FIG. 7, though with a different structural arrangement.

Flexure 800 has two bases, base 802 connected to surface A 804 and base 806 connected to surface B 808, which may be about parallel to surface A 804. One or more flexures are disposed between the bases. In this illustrative embodiment, two flexures are provided (flexure 810 and flexure 812), though only one flexure may be present in some illustrative embodiments, and more than two flexures may be present in other illustrative embodiments. However, in one illustrative embodiment, the flexures are preferably in pairs in order to keep the motion about parallel to the base.

Drive assemblies may be used to move the flexures, such as drive assembly 814, drive assembly 816, drive assembly 818, and drive assembly 820. These drive assemblies may be armatures and linear motor windings, as described above, but may be other types of drive systems such as drive shafts, screws, or any other suitable drive system.

The illustrative embodiment described with respect to FIG. 8 is more flexible than those shown in FIG. 1 through FIG. 7, as it is not length constrained. Thus, this arrangement may be desirable for implementations where a greater range of motion is desirable.

Figure 9:
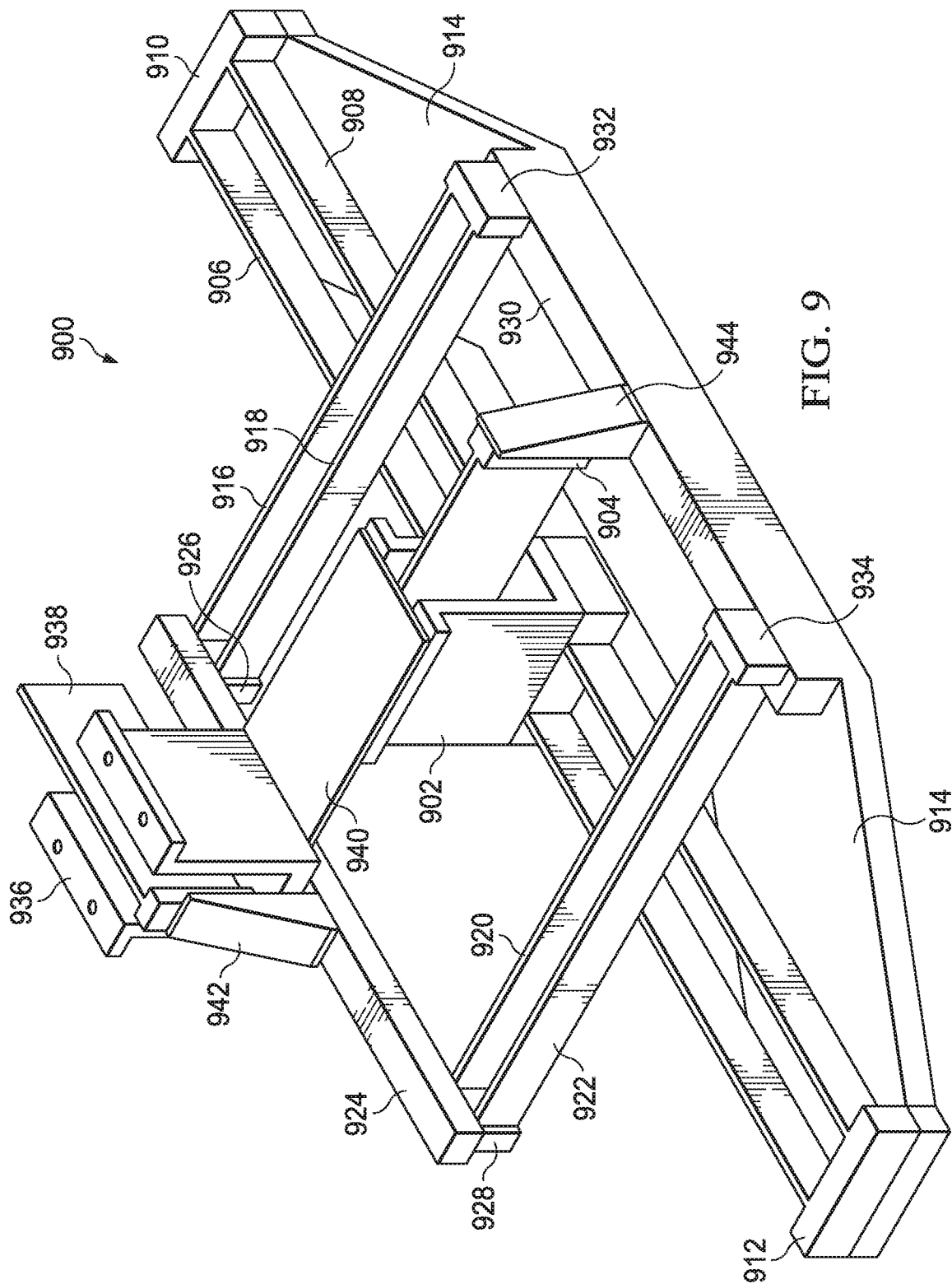
FIG. 9 illustrates an alternative complex flexure assembly, in accordance with an illustrative embodiment.

FIG. 9 illustrates an alternative complex flexure assembly, in accordance with an illustrative embodiment. Flexure assembly 900 is an alternative to the flexure assemblies described with respect to FIG. 1 through FIG. 8.

Flexure assembly 900 uses a double drive unit; namely, armature 902, linear motor winding 904, and gusset support 944 to create movement in flexure 906 and flexure 908 and armature 936, linear motor winding 938, and gusset support 942 to create movement in flexure 922 and flexure 920 and in flexure 916 and flexure 918. Armature 936 is connected to armature 902 by motor mounting plate 940. Gusset support 942, gusset support 944, and motor mounting plate 940 are constructed from structural materials such as, for example, steel, titanium, or aluminum. Flexure 906 and flexure 908 are disposed between flange 910 and flange 912 of base 914. However, in addition, four other flexures are provided perpendicular to flexure 906 and flexure 908. In particular, these additional flexures are flexure 916 and flexure 918 that are parallel to flexure 920 and flexure 922 opposite armature 902 and linear motor winding 904 (or whatever is used for the drive assembly). To ensure that movement of these latter flexure assemblies are kept in tandem, all four are connected to cross-beam 924 via flange 926 and flange 928, as well as to mount extension 930 via flange 932 and flange 934. These latter four flexures bend with the bending of either or both of flexures 906 and 908, or base 914. The pairs of flexure 934 and flexure 932 offer more range and lower stiffness that may be used to tune the system to allow tip and tilt more so than axial rotations about the telescope central axis.

Figure 10:
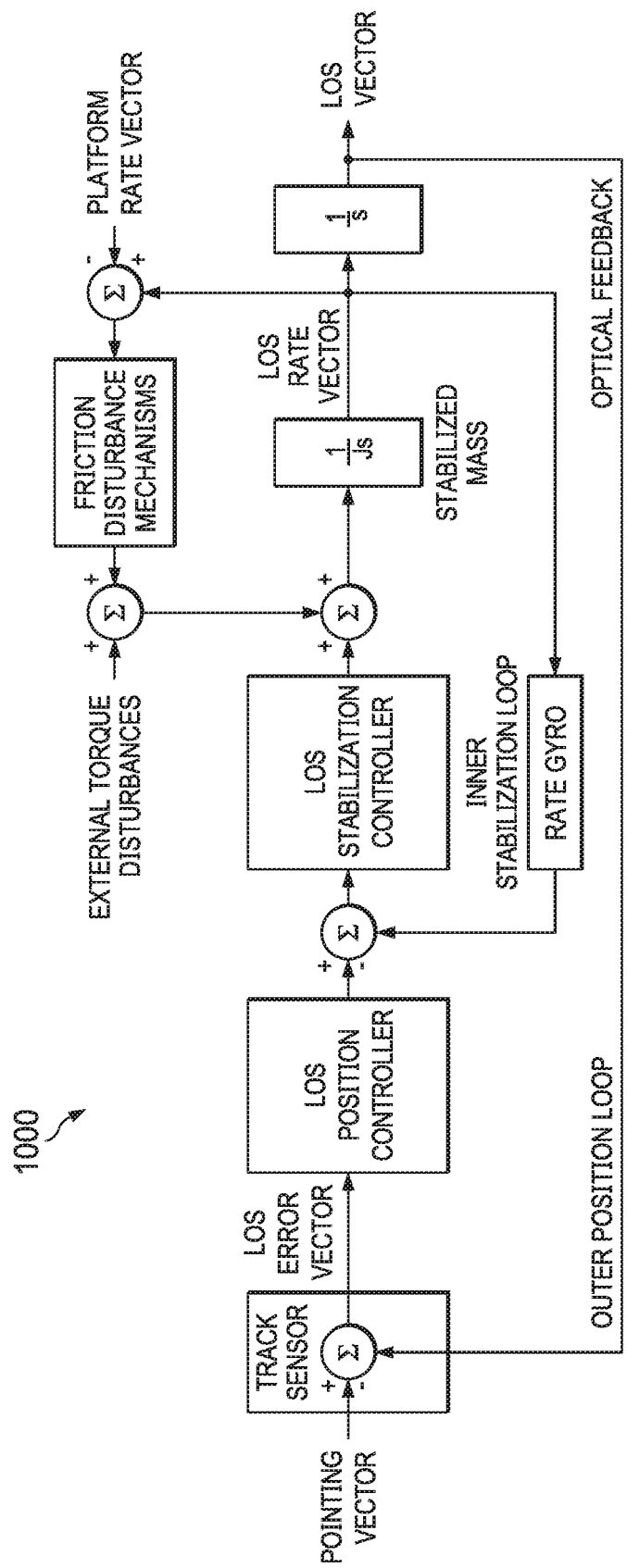
FIG. 10 illustrates a control system for use in controlling operation of the flexure assemblies disclosed herein in order to more accurately point a telescope, in accordance with an illustrative embodiment.

FIG. 10 illustrates a control system for use in controlling operation of the flexure assemblies disclosed herein in order to more accurately point a telescope, in accordance with an illustrative embodiment. Control system 1000 may be used to control any of the drive systems described above, such as but not limited to the armatures and linear winding motors described above. As used in FIG. 10, the term "LOS" means "line of sight".

Figure 11:
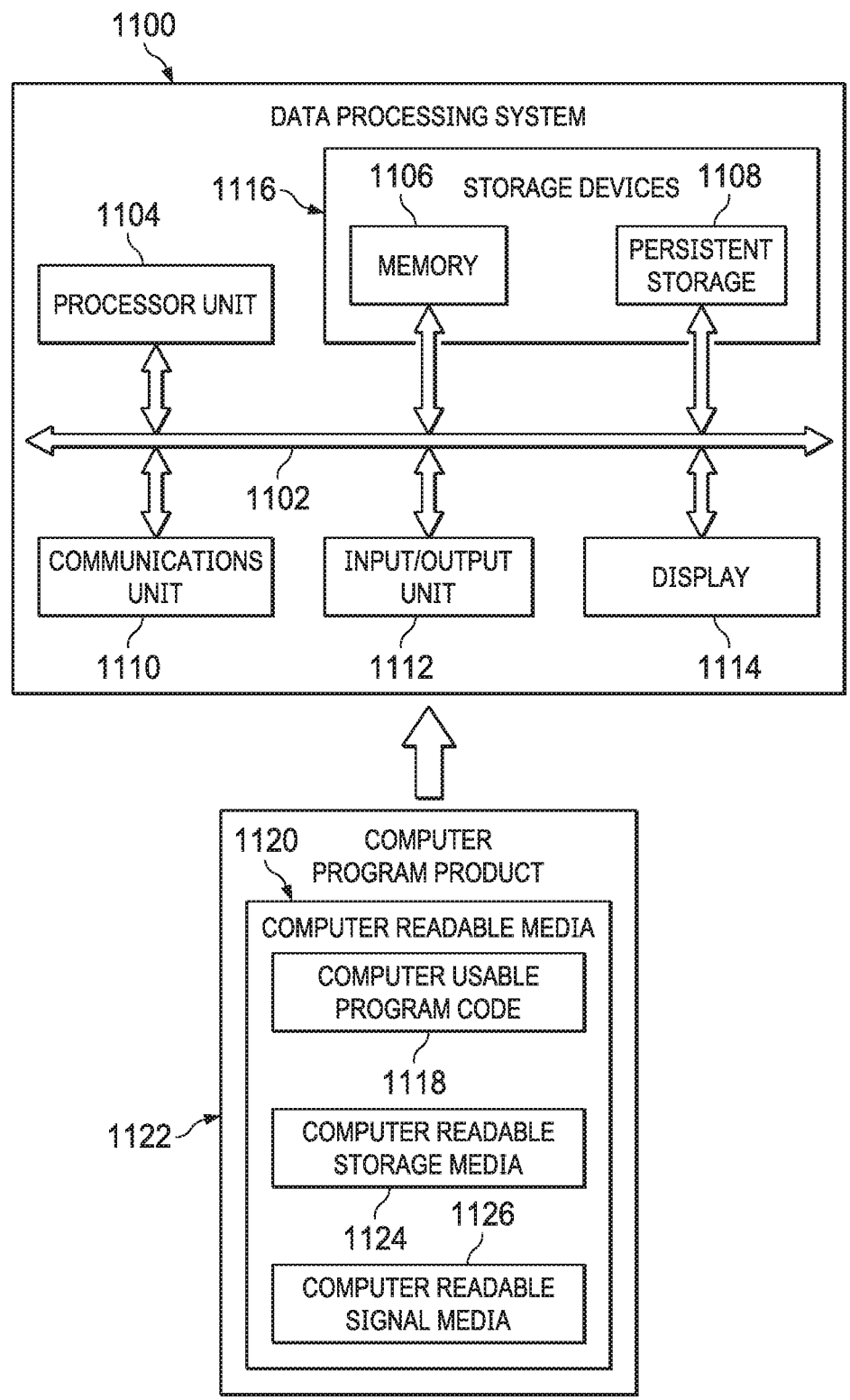
FIG. 11 illustrates a data processing system, in accordance with an illustrative embodiment.

Turning now to FIG. 11, an illustration of a data processing system is depicted in accordance with an illustrative embodiment. Data processing system 1100 in FIG. 11 is an example of a data processing system that may be used to implement the illustrative embodiments, such as those described with respect to FIG. 2 through FIG. 11. In this illustrative example, data processing system 1100 includes communications fabric 1102, which provides communications between processor unit 1104, memory 1106, persistent storage 1108, communications unit 1110, input/output (I/O) unit 1112, and display 1114.

Processor unit 1104 serves to execute instructions for software that may be loaded into memory 1106. This software may be a content addressable memory, or software for implementing the processes described elsewhere herein. Thus, for example, software loaded into memory 1106 may be software for executing the methods described with respect to FIG. 2 through FIG. 11. Processor unit 1104 may be a number of processors, a multi-processor core, or some other type of processor, depending on the particular implementation. A number, as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output (I/O) unit 1112 allows for input and output of data with other devices that may be connected to data processing system 1100. For example, input/output (I/O) unit 1112 may provide a connection for user input through a keyboard, a mouse, and/or some other suitable input device. Further, input/output (I/O) unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1118 may be omitted because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

As another example, a storage device in data processing system 1100 is any hardware apparatus that may store data. Memory 1106, persistent storage 1108, and computer readable media 1120 are examples of storage devices in a tangible form.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1106, or a cache, such as found in an interface and memory controller hub that may be present in communications fabric 1102.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid-state memory, magnetic tape, a removable computer diskette, a random-access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A telescope comprising:
   a housing;
   an optical assembly disposed inside the housing and configured to gather light from a distant object; and
   a jitter reduction system connected to the housing, the jitter reduction system comprising:
   a first flexure assembly comprising a first base to which is attached to a first armature connected to a first linear motor winding configured to push out a first flexure connected to the first armature and to push out a second flexure connected to the first armature opposite the first flexure, wherein the first flexure and the second flexure have a first normal axis pointing through a center of mass of the optical assembly; and a second flexure assembly comprising a second base to which is attached to a second armature connected to a second linear motor winding configured to push out a third flexure connected to the second armature and to push out a fourth flexure connected to the second armature opposite the third flexure, wherein the third flexure and the fourth flexure have a second normal axis pointing through the center of mass of the optical assembly.

2. The telescope of claim 1 wherein the second flexure assembly is stacked on the first flexure assembly and oriented ninety degrees with respect to both the normal axis and a first longitudinal axis of the first flexure assembly.

3. The telescope of claim 1 wherein the second flexure assembly is located on a different portion of the housing relative to the first flexure assembly.

4. The telescope of claim 3 wherein the jitter reduction system further comprises:
  a third flexure assembly comprising a third base to which is attached to a third armature connected to a third linear motor winding configured to push out a fifth flexure connected to the third armature and to push out a sixth flexure connected to the third armature opposite the fifth flexure, wherein the fifth flexure and the sixth flexure have a third normal axis pointing through the center of mass of the optical assembly, and wherein the third flexure assembly is located on another portion of the housing relative to both the first flexure assembly and the second flexure assembly.

5. The telescope of claim 4 wherein the first flexure assembly, the second flexure assembly, and the third flexure assembly are distributed at one-hundred twenty degree angles about a center of one end of the housing.

6. The telescope of claim 5 wherein the jitter reduction system further comprises:
  a fourth flexure assembly stacked on the first flexure assembly and oriented ninety degrees with respect to both the first normal axis and a first longitudinal axis of the first flexure assembly, the fourth flexure assembly comprising a fourth base to which is attached to a fourth armature connected to a fourth linear motor winding configured to push out a seventh flexure connected to the fourth armature and to push out an eighth flexure connected to the fourth armature opposite the seventh flexure, wherein the seventh flexure and the eighth flexure have a fourth normal axis pointing through the center of mass of the optical assembly;
  a fifth flexure assembly stacked on the second flexure assembly and oriented ninety degrees with respect to both the second normal axis and a second longitudinal axis of the second flexure assembly, the fifth flexure assembly comprising a fifth base to which is attached to a fifth armature connected to a fifth linear motor winding configured to push out a ninth flexure connected to the fifth armature and to push out a tenth flexure connected to the fifth armature opposite the ninth flexure, wherein the ninth flexure and the tenth flexure have a fifth normal axis pointing through the center of mass of the optical assembly; and
  a sixth flexure assembly stacked on the third flexure assembly and oriented ninety degrees with respect to both the third normal axis and a third longitudinal axis of the third flexure assembly, the sixth flexure assembly comprising a sixth base to which is attached to a sixth armature connected to a sixth linear motor winding configured to push out an eleventh flexure connected to the sixth armature and to push out a twelfth flexure connected to the sixth armature opposite the eleventh flexure, wherein the eleventh flexure and the twelfth flexure have a sixth normal axis pointing through the center of mass of the optical assembly.

7. The telescope of claim 1 wherein the telescope is selected from the group consisting of: a space-based telescope, an airborne telescope, a radio wave telescope, an infrared telescope, a visible wavelength telescope, an ultraviolet telescope, an X-ray telescope, and a gamma ray telescope.

8. A method of reducing jitter during observations by a telescope comprising a housing; an optical assembly disposed inside the housing and configured to gather light from a distant object; and a jitter reduction system connected to the housing, the jitter reduction system comprising: a first flexure assembly comprising a first base to which is attached to a first armature connected to a first linear motor winding configured to push out a first flexure connected to the first armature and to push out a second flexure connected to the first armature opposite the first flexure, wherein the first flexure and the second flexure have a first normal axis pointing through a center of mass of the optical assembly, and wherein the method comprises:
  pointing the telescope towards the distant object;
  operating the telescope as a space-based telescope, and
  responsive to detecting jitter-inducing movement in the telescope, reducing jitter of the telescope by operating the first linear motor winding to push out the first flexure and the second flexure, thereby forcing the telescope to move about the center of mass in a manner which counteracts the jitter.

9. The method of claim 8 wherein the jitter reduction system further comprises: a second flexure assembly comprising a second base to which is attached to a second armature connected to a second linear motor winding configured to push out a third flexure connected to the second armature and to push out a fourth flexure connected to the second armature opposite the third flexure, wherein the third flexure and the fourth flexure have a second normal axis pointing through the center of mass of the optical assembly, and wherein the method further comprises:
  responsive to detecting jitter-inducing movement in the telescope, further reducing jitter of the telescope by operating the second linear motor winding to push out the third flexure and the fourth flexure, thereby forcing the telescope to move about the center of mass in a manner which counteracts the jitter.

10. The method of claim 9 wherein the second flexure assembly is stacked on the first flexure assembly and oriented ninety degrees with respect to both the normal axis and a first longitudinal axis of the first flexure assembly, whereby movement of the first flexure and the second flexure is at a ninety-degree angle relative to the third flexure and the fourth flexure.

11. The method of claim 9 wherein the second flexure assembly is located on a different portion of the housing relative to the first flexure assembly.

12. The method of claim 11 wherein the jitter reduction assembly further comprises: a third flexure assembly comprising a third base to which is attached to a third armature connected to a third linear motor winding configured to push out a fifth flexure connected to the third armature and to push out a sixth flexure connected to the third armature opposite the fifth flexure, wherein the fifth flexure and the sixth flexure have a third normal axis pointing through the center of mass of the optical assembly, and wherein the third flexure assembly is located on another portion of the housing relative to both the first flexure assembly and the second flexure assembly, and wherein the method further comprises:

responsive to detecting jitter-inducing movement in the telescope, further reducing jitter of the telescope by operating the third linear motor winding to push out the fifth flexure and the sixth flexure, thereby forcing the telescope to move about the center of mass in a manner which counteracts the jitter.

13. The method of claim 12 wherein the first flexure assembly, the second flexure assembly, and the third flexure assembly are distributed at one-hundred twenty degree angles about a center of one end of the housing.

14. The method of claim 13 wherein the jitter reduction system further comprises a fourth flexure assembly stacked on the first flexure assembly and oriented ninety degrees with respect to both the first normal axis and a first longitudinal axis of the first flexure assembly, the fourth flexure assembly comprising a fourth base to which is attached to a fourth armature connected to a fourth linear motor winding configured to push out a seventh flexure connected to the fourth armature and to push out an eighth flexure connected to the fourth armature opposite the seventh flexure, wherein the seventh flexure and the eighth flexure have a fourth normal axis pointing through the center of mass of the optical assembly; a fifth flexure assembly stacked on the second flexure assembly and oriented ninety degrees with respect to both the second normal axis and a second longitudinal axis of the second flexure assembly, the fifth flexure assembly comprising a fifth base to which is attached to a fifth armature connected to a fifth linear motor winding configured to push out a ninth flexure connected to the fifth armature and to push out a tenth flexure connected to the fifth armature opposite the ninth flexure, wherein the ninth flexure and the tenth flexure have a fifth normal axis pointing through the center of mass of the optical assembly; and a sixth flexure assembly stacked on the third flexure assembly and oriented ninety degrees with respect to both the third normal axis and a third longitudinal axis of the third flexure assembly, the sixth flexure assembly comprising a sixth base to which is attached to a sixth armature connected to a sixth linear motor winding configured to push out an eleventh flexure connected to the sixth armature and to push out a twelfth flexure connected to the sixth armature opposite the eleventh flexure, wherein the eleventh flexure and the twelfth flexure have a sixth normal axis pointing through the center of mass of the optical assembly, and wherein the method further comprises:

responsive to detecting jitter-inducing movement in the telescope, further reducing jitter of the telescope by: operating all linear motor windings to push out the all flexures, thereby forcing the telescope to move about the center of mass in a manner which counteracts the jitter.

15. The method of claim 8 further comprising: launching the telescope into space.

16. A telescope comprising:
a housing;
an optical assembly disposed inside the housing and configured to gather light from a distant object; and
a jitter reduction system connected to the housing, the jitter reduction system comprising:
a plurality of flexure assemblies comprising corresponding bases to which are attached corresponding armatures connected to corresponding linear motor windings configured to push out corresponding flexures connected to the corresponding armatures, wherein all flexures have corresponding normal axes which all point through a center of mass of the optical assembly; and
an additional plurality of flexure assemblies connected to the plurality of flexure assemblies such that the jitter reduction system comprises pairs of stacked flexure assemblies distributed around a center of one end of the housing.

17. The telescope of claim 16 wherein the pairs of stacked flexure assemblies are evenly distributed about the center.

18. A method of reducing jitter during observations by a telescope comprising a housing; an optical assembly disposed inside the housing and configured to gather light from a distant object; and a jitter reduction system connected to the housing, the jitter reduction system comprising: a first flexure assembly comprising a first base to which is attached to a first armature connected to a first linear motor winding configured to push out a first flexure connected to the first armature and to push out a second flexure connected to the first armature opposite the first flexure, wherein the first flexure and the second flexure have a first normal axis pointing through a center of mass of the optical assembly; and a second flexure assembly comprising a second base to which is attached to a second armature connected to a second linear motor winding configured to push out a third flexure connected to the second armature and to push out a fourth flexure connected to the second armature opposite the third flexure, wherein the third flexure and the fourth flexure have a second normal axis pointing through the center of mass of the optical assembly, and wherein the method comprises:

pointing the telescope towards the distant object;
responsive to detecting jitter-inducing movement in the telescope, reducing jitter of the telescope by operating the first linear motor winding to push out the first flexure and the second flexure and operating the second linear motor winding to push out the third flexure and the fourth flexure, thereby forcing the telescope to move about the center of mass in a manner which counteracts the jitter.

* * * * *